(12) United States Patent
Nomura et al.

(10) Patent No.: US 11,765,047 B2
(45) Date of Patent: Sep. 19, 2023

(54) CONTROL DEVICE, CONTROL METHOD, AND CONTROL PROGRAM

(71) Applicant: NIPPON TELEGRAPH AND TELEPHONE CORPORATION, Tokyo (JP)

(72) Inventors: Koki Nomura, Musashino (JP); Iifan Tyou, Musashino (JP); Tetsuhiko Murata, Musashino (JP); Koji Morishita, Musashino (JP); Kenji Ota, Musashino (JP); Akio Mukaiyama, Musashino (JP); Takahiro Nukushina, Musashino (JP); Hiroki Nagayama, Musashino (JP); Yukio Nagafuchi, Musashino (JP); Masaki Tanikawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/611,190

(22) PCT Filed: Jun. 11, 2019

(86) PCT No.: PCT/JP2019/023161
§ 371 (c)(1),
(2) Date: Nov. 15, 2021

(87) PCT Pub. No.: WO2020/250319
PCT Pub. Date: Dec. 17, 2020

(65) Prior Publication Data
US 2022/0311677 A1 Sep. 29, 2022

(51) Int. Cl.
*H04L 29/08* (2006.01)
*H04L 41/16* (2022.01)
(Continued)

(52) U.S. Cl.
CPC .............. *H04L 41/16* (2013.01); *G16Y 20/10* (2020.01); *G16Y 30/00* (2020.01); *G16Y 40/10* (2020.01); *H04L 67/12* (2013.01)

(58) Field of Classification Search
CPC .......... H04L 41/16; H04L 67/12; G16Y 20/10
(Continued)

(56) References Cited

U.S. PATENT DOCUMENTS

2018/0005537 A1* 1/2018 Kato .................. G09B 5/04
2020/0150253 A1* 5/2020 Chinnan .............. G06N 7/005

FOREIGN PATENT DOCUMENTS

JP 2016-136233 A 7/2016

OTHER PUBLICATIONS

Tyou, Iifan et al., "A study of decentralized IoT Security Controller", The Institute of Electronics, Information and Communication Engineers, vol. 117, No. 481, 2018, pp. 43-48.

* cited by examiner

*Primary Examiner* — Adnan M Mirza
(74) *Attorney, Agent, or Firm* — XSENSUS LLP

(57) ABSTRACT

Provided is an IoT GW (10), including a learning unit (131) configured to create, for each IoT device connected to the IoT GW (10), a normal communication model (122) that has learned a normal communication pattern of the IoT device; and a determination unit (132) configured to: determine, for learning by the learning unit (131), whether to interrupt, finish, continue, and resume learning based on a load of a learning environment; and control learning processing by the learning unit (131) based on a result of determination.

10 Claims, 11 Drawing Sheets

(51) Int. Cl.
*G16Y 20/10* (2020.01)
*G16Y 40/10* (2020.01)
*G16Y 30/00* (2020.01)
*H04L 67/12* (2022.01)

(58) Field of Classification Search
USPC .......................................................... 709/223
See application file for complete search history.

CONTROL DEVICE, CONTROL METHOD, AND CONTROL PROGRAM

CROSS-REFERENCE TO RELATED APPLICATION

The present application is based on PCT filing PCT/JP2019/023161, filed Jun. 11, 2019, the entire contents of which are incorporated herein by reference.

TECHNICAL FIELD

The present invention relates to a control device, a control method, and a control program.

BACKGROUND ART

There is known an IoT (Internet of Things) gateway (GW) that connects devices such as a camera and a temperature and humidity sensor to a communication network as IoT devices. Normal communication patterns of an IoT device are limited in such a manner that the IoT device normally communicates only with a limited communication destination, for example. Thus, the IoT GW creates a model (hereinafter referred to as "normal communication model") that covers normal communication patterns as security measures for the IoT device (e.g., refer to Non-Patent Literature 1). Then, when the IoT device performs communication via the IoT GW, the IoT GW allows only normal communication that satisfies the normal communication model, or blocks abnormal communication that does not satisfy the normal communication model.

CITATION LIST

Non Patent Literature

[NPL 1] Iifan Tyou, et al., "A study of decentralized IoT Security Controller", IEICE Technical Report, ICSS2017-58 (2018-03).

SUMMARY OF THE INVENTION

Technical Problem

However, when learning is performed for a short period of time, there is a possibility that the accuracy of the normal communication model decreases, and excess or insufficiency of the normal communication model occurs after application thereof. On the other hand, when learning is performed for a long period of time to ensure the accuracy, there is a problem in that creation of the normal communication model takes much time and convenience is degraded.

The present invention has been made in view of the above, and has an object to provide a control device, a control method, and a control program, which are capable of achieving communication control of an IoT device while at the same time securing the accuracy and convenience of the normal communication model.

Means for Solving the Problem

In order to solve the above-mentioned problem and achieve the object, a control device according to the present invention includes: a learning unit configured to create, for each IoT device connected to an IoT GW, a normal communication model that has learned a normal communication pattern of the IoT device; and a determination unit configured to: determine, for learning by the learning unit, whether to interrupt, finish, continue, and resume learning based on a load of a learning environment; and control learning processing by the learning unit based on a result of determination.

Furthermore, a control method according to the present invention is a control method to be executed by a control device, the control method comprising: a learning process of creating, for each IoT device connected to an IoT gateway, a normal communication model that has learned a normal communication pattern of the IoT device; and a determination process of: determining, for learning by the learning process, whether to interrupt, finish, continue, and resume learning based on a load of a learning environment; and controlling learning processing in the learning process based on a result of determination.

Furthermore, a control program according to the present invention causes a computer to execute: a learning step of creating, for each IoT device connected to an IoT gateway, a normal communication model that has learned a normal communication pattern of the IoT device; and a determination step of: determining, for learning by the learning step, whether to interrupt, finish, continue, and resume learning based on a load of a learning environment; and controlling learning processing in the learning step based on a result of determination.

Effects of the Invention

According to the present invention, it is possible to implement communication control of the IoT device while at the same time securing the accuracy and convenience of the normal communication model.

DESCRIPTION OF EMBODIMENTS

Figure 1:
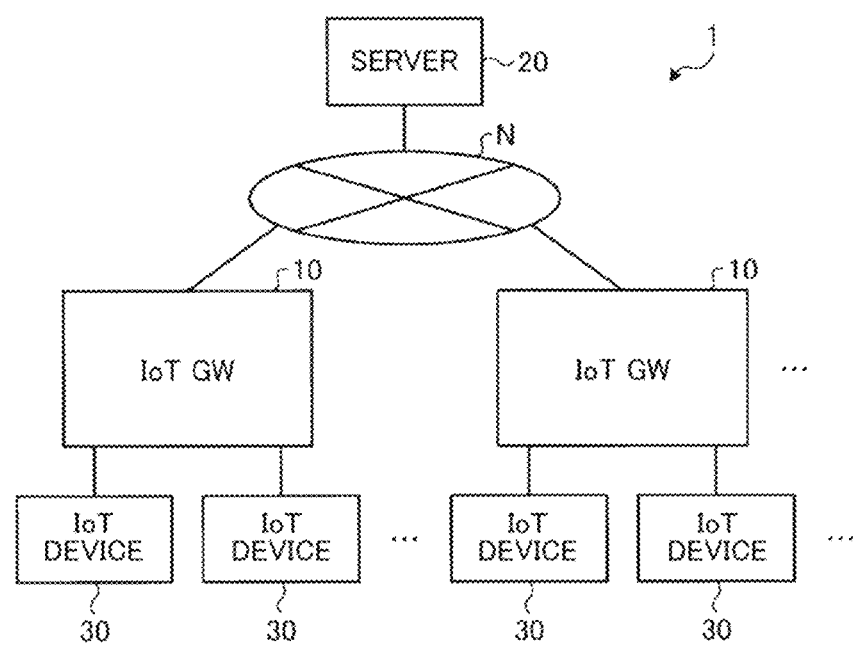
FIG. 1 is a diagram illustrating an exemplary configuration of a communication system according to an embodiment.

Now, description is given in detail of an embodiment of the present invention with reference to the drawings. This embodiment does not limit the present invention. Furthermore, the same components are assigned with the same reference numerals in the description of the drawings.

Embodiment

In this embodiment, description is given of a communication system configured to control communication by an IoT device connected to an IoT GW by using a normal communication model that covers normal communication patterns of the IoT device.

[Exemplary Configuration of Communication System]

Now, description is given of a communication system according to an embodiment. FIG. 1 is a diagram illustrating an exemplary configuration of a communication system 1 according to an embodiment. The communication system 1 according to an embodiment has a configuration in which a plurality of IoT GWs 10 (control device) and a server 20 are connected to one another via a network N. Each IoT GW 10 accommodates a plurality of IoT devices 30.

The IoT GW 10 controls communication between the IoT device 30 under its control and an external device via the network N. The IoT GW 10 is, for example, a device provided by a service provider that provides an IoT service. The IoT GW 10 receives information from the IoT device 30 under its control, and transmits the information to the server 20. Furthermore, the IoT GW 10 controls communication by the IoT device 30 based on information received from the IoT device 30 under its control or information set in advance, for example. The IoT GW 10 blocks communication by the IoT device 30, which has caused abnormal communication, based on a normal communication model for communication by the IoT device 30. Furthermore, the IoT GW 10 executes processing of notifying a user of occurrence of abnormal communication.

The server 20 is an information processing apparatus to be managed by a service provider that provides the IoT GW 10. The configuration of the server 20 is not particularly limited. The server 20 may be, for example, one physical server, or a virtual server that is virtually constructed across a plurality of servers.

The IoT device 30 is a device to be controlled by the IoT GW 10. The IoT device 30 is, for example, a sensor such as a temperature sensor, an illuminance sensor, a human sensor, or an opening/closing sensor arranged in a predetermined space and at a predetermined position. Furthermore, for example, the IoT device 30 is an information processing device for which an amount of electric power consumption is controlled by the IoT service. Furthermore, for example, the IoT device 30 is an image pickup device that photographs an image of a predetermined space and transmits the image to the IoT GW 10. The number of IoT devices 30 to be accommodated in each IoT GW 10 is not particularly limited.

The IoT device 30 is communicably connected to the IoT GW 10. The IoT device 30 and the IoT GW 10 are connected to each other via a wired network, a wireless network, or a combination thereof.

[Configuration of IoT GW]

Figure 2:
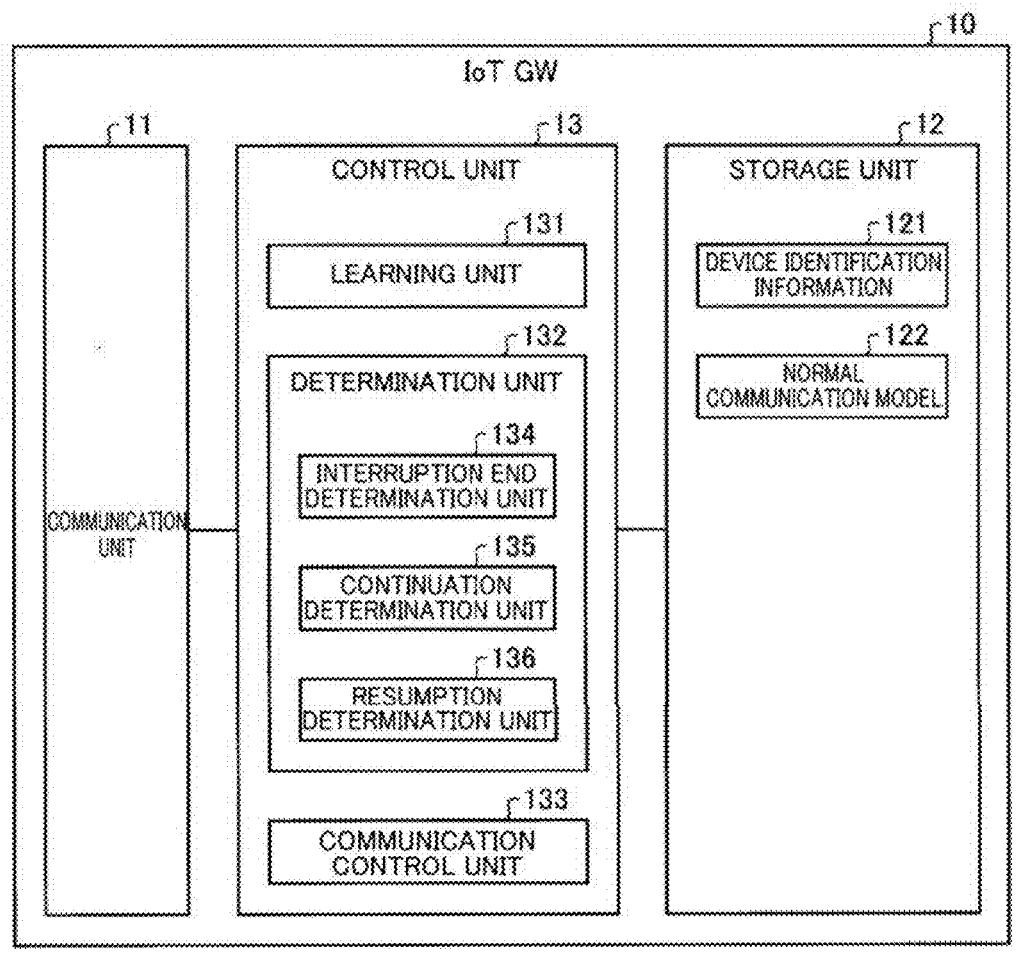
FIG. 2 is a block diagram illustrating an exemplary configuration of an IoT GW illustrated in FIG. 1.

Now, description is given of an example of the configuration and function of the IoT GW 10 with reference to FIG. 2. FIG. 2 is a block diagram illustrating an exemplary configuration of the IoT GW 10 illustrated in FIG. 1. As illustrated in FIG. 2, the IoT GW 10 includes a communication unit 11, a storage unit 12, and a control unit 13.

The communication unit 11 is a communication interface that transmits/receives various kinds of information to/from other devices connected to, for example, a network. The communication unit 11 is implemented by, for example, a network interface card (NIC), and performs communication between other devices and the control unit 13 (described later) via a telecommunications line such as a local area network (LAN) or the Internet. For example, the communication unit 11 communicates with the IoT device 30. Furthermore, the communication unit 11 communicates with the server 20.

The storage unit 12 is implemented by a semiconductor memory device such as a random access memory (RAM) or a flash memory, or a storage device such as a hard disk or an optical disc, and stores a processing program that operates the IoT GW 10 and data to be used during execution of the processing program, for example. The storage unit 12 includes a device identification information 121 and a normal communication model 122.

The device identification information 121 is information indicating characteristics of communication by the IoT device 30, and is, for example, information indicating a communication pattern of the IoT device 30. The device identification information 121 is information that can be obtained by the IoT GW 10 grasping and analyzing communication by the IoT device 30. The device identification information 121 is, for example, characteristics such as an open port for each device, a communication destination, a communication frequency, a communication protocol, a communication data size, and a payload. The device identification information 121 is, for example, a domain name of the communication destination of the IoT device 30.

The normal communication model 122 is a model that has learned a normal communication pattern of each IoT device 30, and is created for each IoT device 30. The normal communication model 122 is created by the IoT GW 10 statistically analyzing and learning communication by each IoT device 30 from a plurality of viewpoints such as the number of communication destinations and a packet size. The normal communication model 122 is information on normal communication, and when the IoT device 30 performs communication via the IoT GW 10, the IoT GW 10 allows only normal communication that satisfies the normal communication model 122, or blocks abnormal communication that does not satisfy the normal communication model.

Figure 3:
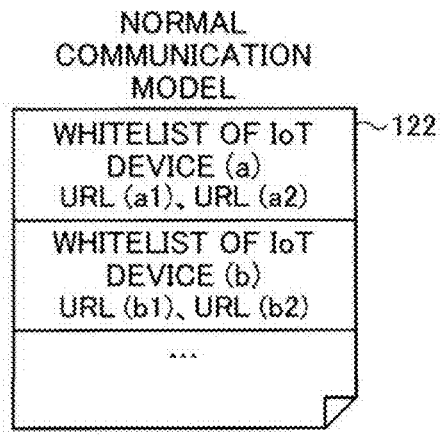
FIG. 3 is a diagram illustrating an example of a normal communication model.

FIG. 3 is a diagram illustrating an example of the normal communication model 122. As illustrated in FIG. 3, the normal communication model 122 is, for example, a whitelist based on communication records. For example, the normal communication model 122 is a group of whitelists created for each IoT device 30. Specifically, the normal communication model 122 has a whitelist indicating that the normal communication destinations of an IoT device (a) are "URL(a1)" and "URL(a2)".

Furthermore, the normal communication model 122 may be information indicating a confidence interval based on statistics values of communication. The statistics values are features of a packet per unit time, and are, for example, the number of transmission packets and the number of reception packets.

The control unit 13 controls the overall operation of the IoT GW 10. The control unit 13 is, for example, an electronic circuit such as a central processing unit (CPU) or a micro processing unit (MPU), or an integrated circuit such as an application specific integrated circuit (ASIC) or a field programmable gate array (FPGA). Furthermore, the control unit 13 includes an internal memory for storing a program or control data that defines various kinds of processing procedures, and uses the internal memory to execute each processing. Furthermore, the control unit 13 functions as various kinds of processing units through operation of various kinds of programs. The control unit 13 includes a learning unit 131, a determination unit 132, and a communication control unit 133.

The learning unit 131 creates, for each IoT device 30, the normal communication model 122 that has learned the normal communication pattern of the IoT device 30 connected to the IoT GW 10. Furthermore, the learning unit 131 interrupts, finishes, continues, or resumes learning of the normal communication pattern of the IoT device 30 in accordance with the result of determination by the determination unit 132, and continuously creates and updates the normal communication model 122. The learning unit 131 can create or update the latest normal communication model 122 by continuing or resuming learning for a period determined by the determination unit 132. Any existing learning method may be used as the learning method.

As the learning environment, such an extremely low-performance environment as to cause a large load (e.g., CPU usage is equal to or larger than 90%) only through learning of communication by about one or two IoT devices 30 is not assumed. Furthermore, this embodiment assumes a case in which learning is interrupted and then continued. Furthermore, in the case of communication by batch processing, all the details of communication between start of the communication and end of the communication are required to be learned. In this embodiment, learning may be interrupted during communication, and thus adoption of the batch processing is not recommended.

The determination unit 132 determines, for learning by the learning unit 131, whether to interrupt, finish, continue, and resume learning based on the load of the learning environment, and controls learning processing by the learning unit 131 based on the result of determination. The determination unit 132 controls the period of learning by the learning unit 131 to prevent degradation of convenience of the normal communication model 122 while at the same time securing the accuracy of the normal communication model 122 for the IoT device 30.

The determination unit 132 controls the period of learning by the learning unit 131 based on the load of the learning environment, the number of IoT devices 30 to be learned, the result of learning, or a period since end of previous learning. The determination unit 132 includes an interruption end determination unit 134 (first determination unit), a continuation determination unit 135 (second determination unit), and a resumption determination unit 136 (third determination unit).

The interruption end determination unit 134 determines, for each IoT device being learned, whether to interrupt or finish learning by the learning unit 131 based on the load of the learning environment, the number of IoT devices 30 to be learned, and the result of learning. When interruption of learning is determined, the interruption end determination unit 134 causes the learning unit 131 to interrupt learning of the IoT device 30 for which interruption of learning has been determined. When end of learning is determined, the interruption end determination unit 134 causes the learning unit 131 to finish learning of the IoT device 30 for which end of learning has been determined.

When the result of learning has converged to fall below a fixed value, that is, when the convergence rate is smaller than a fixed value, the interruption end determination unit 134 determines end of learning. When the convergence rate is equal to or larger than the fixed value, the interruption end determination unit 134 determines interruption of learning.

Figure 4:
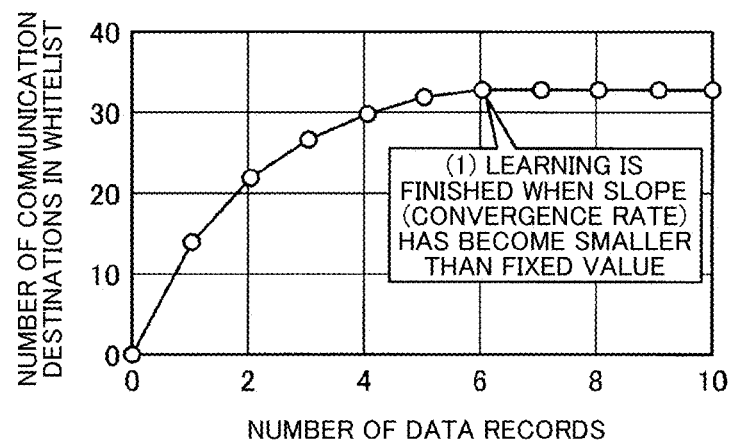
FIG. 4 is a diagram illustrating a result of learning a communication pattern of the IoT device and convergence thereof.
Figure 5:
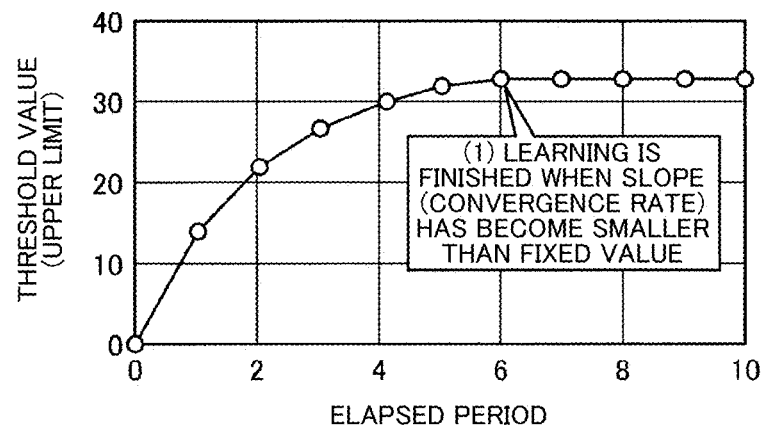
FIG. 5 is a diagram illustrating the result of learning a communication pattern of the IoT device and convergence thereof.

FIG. 4 and FIG. 5 are diagrams illustrating the result of learning a communication pattern of the IoT device 30 and convergence thereof. FIG. 4 illustrates the case of a whitelist, and the slope of a graph indicating a change in the number of communication destinations of the whitelist with respect to the number of records of learning data is the convergence rate. In this case, learning is finished at a time point in which the slope (convergence rate) is smaller than the fixed value (refer to (1) of FIG. 4). Furthermore, FIG. 5 illustrates the case of a communication section, and the slope of a graph indicating a change in threshold value with respect to an elapsed period is the convergence rate. In this case, learning is finished at a time point in which the slope (convergence rate) is smaller than the fixed value (refer to (1) of FIG. 5).

The continuation determination unit 135 periodically determines, for each IoT device 30 for which learning is interrupted, whether to continue interrupted learning based on the load of the learning environment, the number of IoT devices 30 to be learned, and the length of the interruption period. When the continuation determination unit 135 has determined to continue learning, the continuation determination unit 135 causes the learning unit 131 to continue learning of the IoT device 30 for which continuation of learning has been determined.

The continuation determination unit 135 causes the learning unit 131 to continue learning of communication by the same number of IoT devices 30 as those satisfying a predetermined condition. For example, one predetermined condition specifies that the resource usage rate of the IoT GW 10 is equal to or larger than b % and smaller than a %. When this condition is satisfied, the continuation determination unit 135 causes the learning unit 131 to continue learning of one IoT device 30 having the longest most recent interruption period. Furthermore, one predetermined condition specifies that the resource usage rate of the IoT GW 10 is equal to or larger than c % and smaller than b %. When this condition is satisfied, the continuation determination unit 135 causes the learning unit 131 to continue learning of two IoT devices 30 having the longest and second longest most recent interruption periods.

The resumption determination unit 136 periodically determines whether to resume learning based on the load of the learning environment and the number of IoT devices 30 to be learned during a period since end of previous learning, and when the resumption determination unit 136 has determined to resume learning, the resumption determination unit 136 causes the learning unit 131 to resume learning.

The communication control unit 133 uses the normal communication model 122 created or updated by the learning unit 131 to control communication by the IoT device 30. When the IoT device 30 performs communication via the IoT GW 10, the communication control unit 133 allows only normal communication that satisfies the normal communication model 122, or blocks abnormal communication that does not satisfy the normal communication model. The communication control unit 133 applies the normal communication model 122 created or updated by the learning unit 131 by an initial interruption time point of learning or an end time point of learning, to thereby control communication by the IoT device 30. Therefore, the communication control unit 133 can use the latest normal communication model 122.

[Processing Procedure of Control Processing for Learning]

Figure 6:
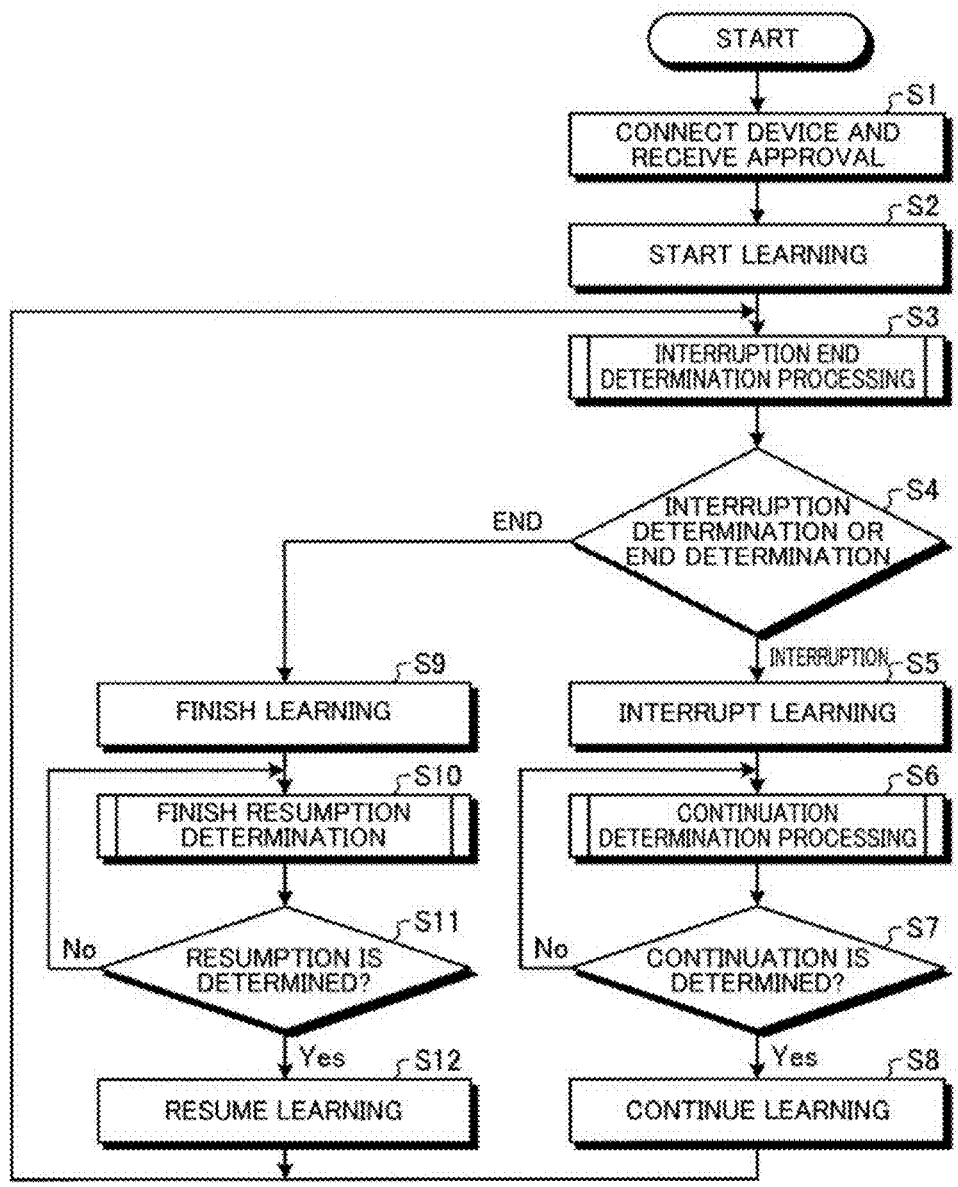
FIG. 6 is a flow chart of a processing procedure of control processing for learning by the IoT GW illustrated in FIG. 2.

Next, description is given of a processing procedure of control processing for learning by the IoT GW 10 with reference to FIG. 6. FIG. 6 is a flow chart of the processing procedure of control processing for learning by the IoT GW 10 illustrated in FIG. 2.

As illustrated in FIG. 6, when the IoT device 30 is connected to the IoT GW 10 and the IoT GW 10 has received an approval of learning by a user (Step S1), the learning unit 131 starts learning (Step S2). The IoT GW 10 periodically applies the normal communication model 122 being created or updated to the IoT device 30 during continuation of learning, and the IoT device 30 executes communication based on the normal communication model 122. The IoT GW 10 interrupts or finishes learning when a predetermined condition is satisfied since start of learning.

First, after start of learning, the interruption end determination unit 134 of the IoT GW 10 periodically executes interruption/end determination processing of determining, for each IoT device 30 being learned, whether to interrupt or finish learning by the learning unit 131 based on the load of the learning environment, the number of IoT devices 30 to be learned, and the result of learning (Step S3). Then, the determination unit 132 determines whether the result of determination in the interruption/end determination processing indicates interruption determination or end determination (Step S4).

When the result of determination in the interruption/end determination processing indicates interruption (Step S4: interruption), the interruption end determination unit 134 interrupts learning by the learning unit 131 (Step S5). In the case of initial learning, the normal communication model 122 is not created, and thus the learning unit 131 provisionally applies the normal communication model 122 created by the time point of interruption to the IoT GW 10. Furthermore, in the case of second and subsequent learning, the already created normal communication model 122 is applied, and thus the learning unit 131 does not apply the normal communication model 122 updated by the time point of interruption. The IoT device 30 executes communication based on the applied normal communication model 122.

Next, the continuation determination unit 135 executes continuation determination processing of periodically determining, for each IoT device 30 for which learning is interrupted, whether to continue interrupted learning based on the load of the learning environment, the number of IoT devices 30 to be learned, and the length of the interruption period (Step S6). The determination unit 132 determines whether the result of determination in the continuation determination processing indicates continuation determination (Step S7).

When the result of determination in the continuation determination processing does not indicate continuation determination (Step S7: No), the processing returns to Step S6, and the continuation determination unit 135 executes the continuation determination processing. On the other hand, when the result of determination in the continuation determination processing indicates continuation determination (Step S7: Yes), the continuation determination unit 135 causes the learning unit 131 to continue learning for the IoT device 30 for which continuation has been determined (Step S8), and the processing proceeds to Step S3.

On the other hand, when the result of determination in the interruption/end determination processing indicates end (Step S4: end), the interruption end determination unit 134 finishes learning by the learning unit 131 (Step S9). The learning unit 131 applies the normal communication model 122 created or updated by the end time point to the IoT GW 10, and the IoT device 30 executes communication based on the normal communication model 122.

After learning is finished, the learning unit 131 resumes learning when a predetermined condition is satisfied. Specifically, the resumption determination unit 136 executes resumption determination processing of periodically determining whether to resume learning based on the load of the learning environment and the number of IoT devices 30 to be learned during a period since previous learning is finished (Step S10). The determination unit 132 determines whether the result of determination in the resumption determination processing indicates resumption determination (Step S11).

When the result of determination in the resumption determination processing does not indicate resumption determination (Step S11: No), the processing returns to Step S10, and the resumption determination unit 136 executes the resumption determination processing. On the other hand, when the result of determination in the resumption determination processing indicates resumption determination (Step S11: Yes), the resumption determination unit 136 causes the learning unit 131 to resume learning for the IoT device 30 for which resumption has been determined (Step S12), and the processing proceeds to Step S3.

The normal communication model 122 being created or updated is not applied to the IoT GW 10 during a period in which the learning unit 131 continues learning. The already created or updated normal communication model 122 is applied to the IoT GW 10.

[Interruption/End Determination Processing]

Figure 7:
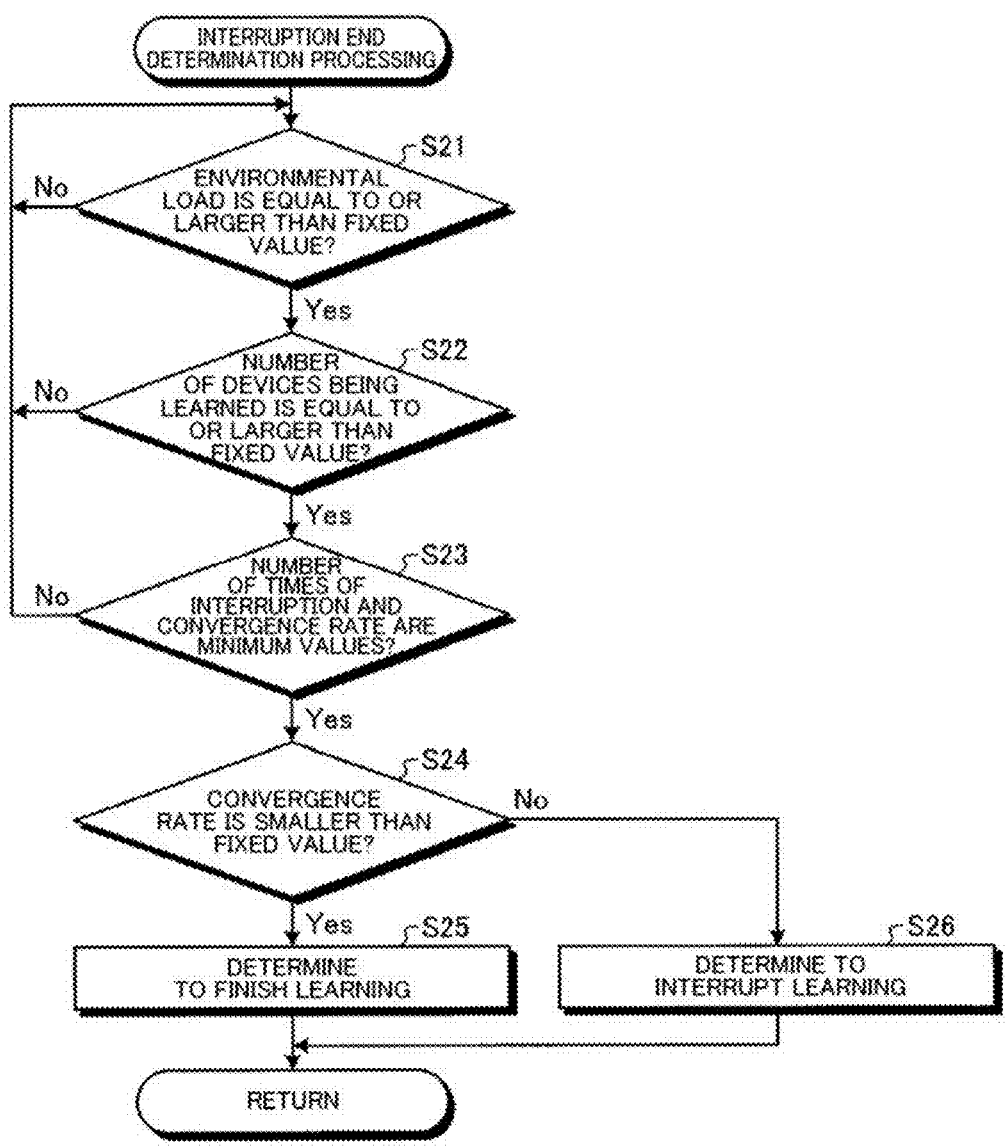
FIG. 7 is a flow chart illustrating a processing procedure of interruption/end determination processing illustrated in FIG. 6.

Next, description is given of the interruption/end determination processing (Step S3) illustrated in FIG. 6. FIG. 7 is a flow chart illustrating a processing procedure of the interruption/end determination processing illustrated in FIG. 6. The interruption end determination unit 134 periodically executes processing illustrated in Step S21 to Step S26, to thereby determine, for each IoT device 30, whether to interrupt or finish learning by the learning unit 131.

As illustrated in FIG. 7, the interruption end determination unit 134 determines whether the environmental load of learning due to learning is equal to or larger than a fixed value (Step S21). The interruption end determination unit 134 determines whether the CPU usage of the own device is equal to or larger than a fixed value or the memory usage of the own device is equal to or larger than a fixed value, for example. A determination value for the CPU usage and a determination value for the memory usage are set in advance.

When the environmental load of learning due to learning is equal to or larger than the fixed value (Step S21: Yes), the interruption end determination unit 134 determines whether the number of all the IoT devices 30 being learned is equal to or larger than a fixed value (Step S22).

When the number of all the IoT devices 30 being learned is equal to or larger than the fixed value (Step S22: Yes), the interruption end determination unit 134 determines, for each IoT device 30 being learned, whether the number of times of interruption is the smallest and the result of learning by the normal communication model 122 has converged at the maximum. In other words, the interruption end determination unit 134 determines, for the IoT device 30 to be determined, whether the number of times of interruption and the convergence rate of learning are the minimum values (Step S23).

When the environmental load of learning due to learning is not equal to or larger than the fixed value (Step S21: No), when the number of all the IoT devices 30 being learned is not equal to or larger than the fixed value (Step S22: No), or when the number of times of interruption and the convergence rate of learning are not the minimum values (Step S23: No), the interruption end determination unit 134 returns to the processing of Step S21.

When there is the IoT device 30 for which the number of times of interruption and the convergence rate of learning are the minimum values (Step S23: Yes), the interruption end determination unit 134 determines, for this IoT device 30, whether the result of learning the normal communication model 122 has converged to fall below a fixed value (threshold value), that is, whether the convergence rate is smaller than a fixed value (Step S24).

When the convergence rate is smaller than the fixed value (Step S24: Yes), the interruption end determination unit 134 determines to finish learning by the learning unit 131 for this IoT device 30 (Step S25). On the other hand, when the convergence rate is not smaller than the fixed value (Step S24: No), the interruption end determination unit 134 determines to interrupt learning by the learning unit 131 for this IoT device 30 (Step S26).

[Continuation Determination Processing]

Figure 8:
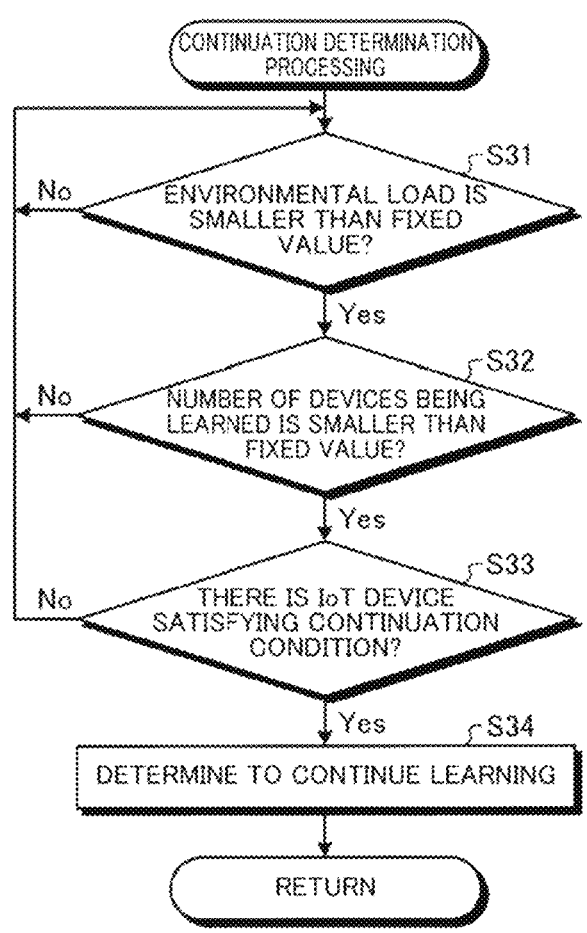
FIG. 8 is a flow chart illustrating a processing procedure of continuation determination processing illustrated in FIG. 6.

Next, description is given of the continuation determination processing (Step S6) illustrated in FIG. 6. FIG. 8 is a flow chart illustrating a processing procedure of the continuation determination processing illustrated in FIG. 6. The continuation determination unit 135 periodically executes processing illustrated in Step S31 to Step S34 to determine whether to continue learning by the learning unit 131 for each IoT device 30.

As illustrated in FIG. 8, the continuation determination unit 135 first determines whether the environmental load of learning due to learning is smaller than a fixed value (Step S31). The continuation determination unit 135 determines whether the CPU usage of the own device is smaller than a fixed value or the memory usage of the own device is smaller than a fixed value, for example. A determination value for the CPU usage and a determination value for the memory usage are set in advance.

When the environmental load of learning due to learning is smaller than the fixed value (Step S31: Yes), the continuation determination unit 135 determines whether the number of all the IoT devices 30 for which learning is interrupted is smaller than a fixed value (Step S32).

When the number of all the IoT devices 30 for which learning is interrupted is smaller than the fixed value (Step S32: Yes), the continuation determination unit 135 determines whether there is the IoT device 30 that satisfies a predetermined condition depending on the length of the interruption period for the IoT device 30 having a long most recent learning interruption period among all the IoT devices 30 for which learning is interrupted (Step S33).

For example, one predetermined condition specifies that the resource usage rate of the IoT GW 10 is equal to or larger than b % and smaller than a %. When this condition is satisfied, the continuation determination unit 135 causes the learning unit 131 to continue learning of one IoT device 30 having the longest most recent interruption period. Furthermore, one predetermined condition specifies that the resource usage rate of the IoT GW 10 is equal to or larger than c % and smaller than b %. When this condition is satisfied, the continuation determination unit 135 causes the learning unit 131 to continue learning of two IoT devices 30 having the longest and second longest most recent interruption periods.

When there is the IoT device 30 that satisfies the predetermined condition (Step S33: Yes), it is determined whether to cause the learning unit 131 to continue learning for the same number of IoT devices 30 as those satisfying the predetermined condition (Step S34).

When the environmental load of learning due to learning is not smaller than the fixed value (Step S31: No), when the number of all the IoT devices 30 being learned is not smaller than the fixed value (Step S32: No), or when there is no IoT device 30 that satisfies the predetermined condition (Step S33: No), the continuation determination unit 135 returns to the processing of Step S31.

[Resumption Determination Processing]

Figure 9:
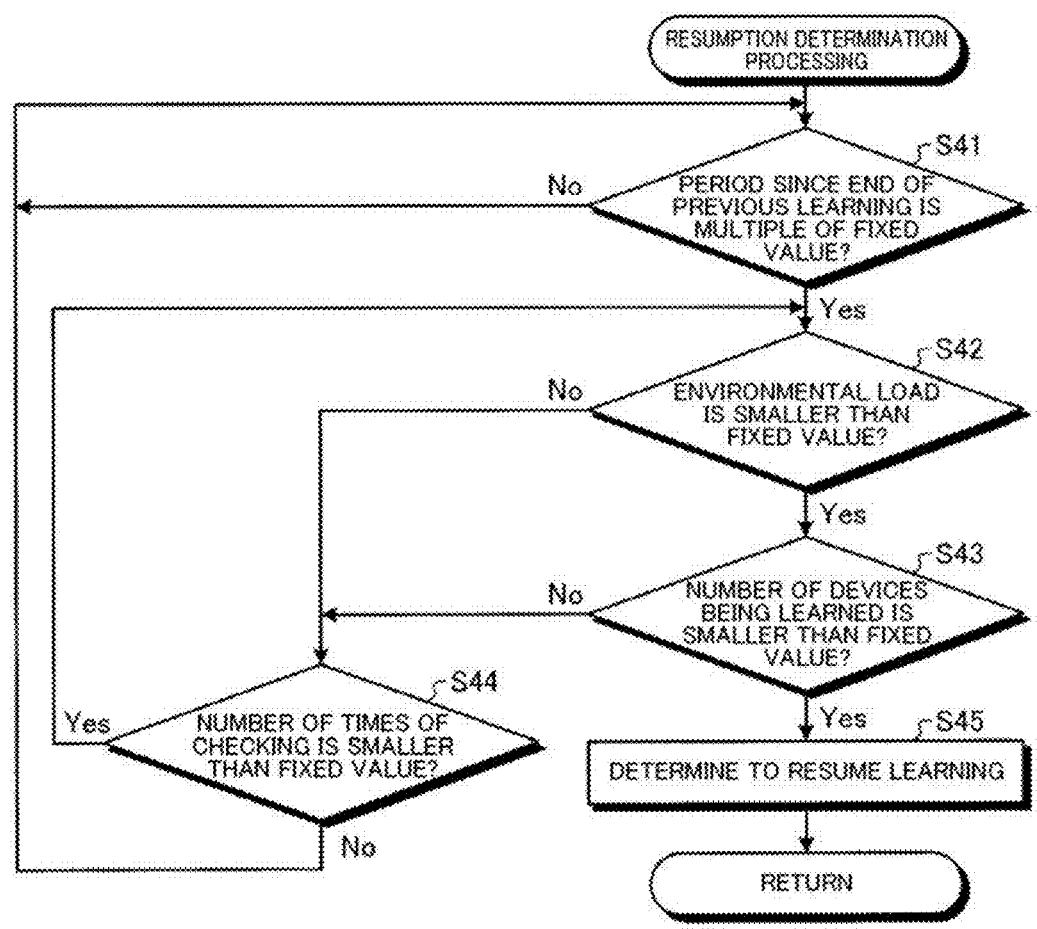
FIG. 9 is a flow chart illustrating a processing procedure of resumption determination processing illustrated in FIG. 6.

Next, description is given of the resumption determination processing (Step S10) illustrated in FIG. 6. FIG. 9 is a flow chart illustrating a processing procedure of the resumption determination processing illustrated in FIG. 6. The resumption determination unit 136 periodically executes processing illustrated in Step S41 to Step S45 to determine whether to continue learning by the learning unit 131.

As illustrated in FIG. 9, the resumption determination unit 136 determines whether the period since end of previous learning is a multiple of a fixed value (Step S41). The fixed value is set in consideration of the environmental load of the IoT GW 10, for example. The fixed value is, for example, one week, two weeks, and three weeks. When the period since end of previous learning is not a multiple of a fixed value (Step S41: No), the resumption determination unit 136 returns to the processing of Step S41.

When the period since end of previous learning is a multiple of a fixed value (Step S41: Yes), the resumption determination unit 136 determines whether a condition that is to be considered for resumption of learning is satisfied.

Specifically, the resumption determination unit 136 determines whether the environmental load of learning due to learning is smaller than a fixed value (Step S42). The interruption end determination unit 134 determines whether the CPU usage of the own device is smaller than a fixed value or the memory usage of the own device is smaller than a fixed value, for example. A determination value for the CPU usage and a determination value for the memory usage are set in advance.

Next, when the environmental load of learning due to learning is smaller than the fixed value (Step S42: Yes), the resumption determination unit 136 determines whether the number of all the IoT devices 30 being learned is smaller than a fixed value (Step S43).

When the number of all the IoT devices 30 being learned is smaller than the fixed value (Step S43: Yes), learning can be resumed, and thus the resumption determination unit 136 determines whether to resume learning by the learning unit 131 (Step S45).

In contrast, when the environmental load of learning due to learning is not smaller than the fixed value (Step S42: No), or when the number of all the IoT devices 30 being learned is not smaller than the fixed value (Step S43: No), the resumption determination unit 136 determines whether the number of times of checking in Step S42 and Step S43 is smaller than a fixed value (Step S44).

When the number of times of checking is smaller than the fixed value (Step S44: Yes), the resumption determination unit 136 returns to the processing of Step S42. Furthermore, when the number of times of checking is not smaller than the fixed value (Step S44: No), the resumption determination unit 136 returns to the processing of Step S41.

Effect of Embodiment

The IoT GW 10 according to this embodiment creates, for each IoT device 30, a normal communication model that has learned a normal communication pattern of the IoT device 30 connected to the own device. Then, the IoT GW 10 determines, for learning by the learning unit 131, whether to interrupt, finish, continue, and resume learning, and controls the processing of learning by the learning unit 131 based on the result of determination. Then, the IoT GW 10 applies the normal communication model created by the learning unit 131 to control communication by the IoT device 30.

In this manner, IoT GW 10 implement control of communication by the IoT device 30 while at the same time securing the accuracy and convenience of the normal communication model by periodically applying the latest normal communication model created or updated through continued learning.

Figure 10:
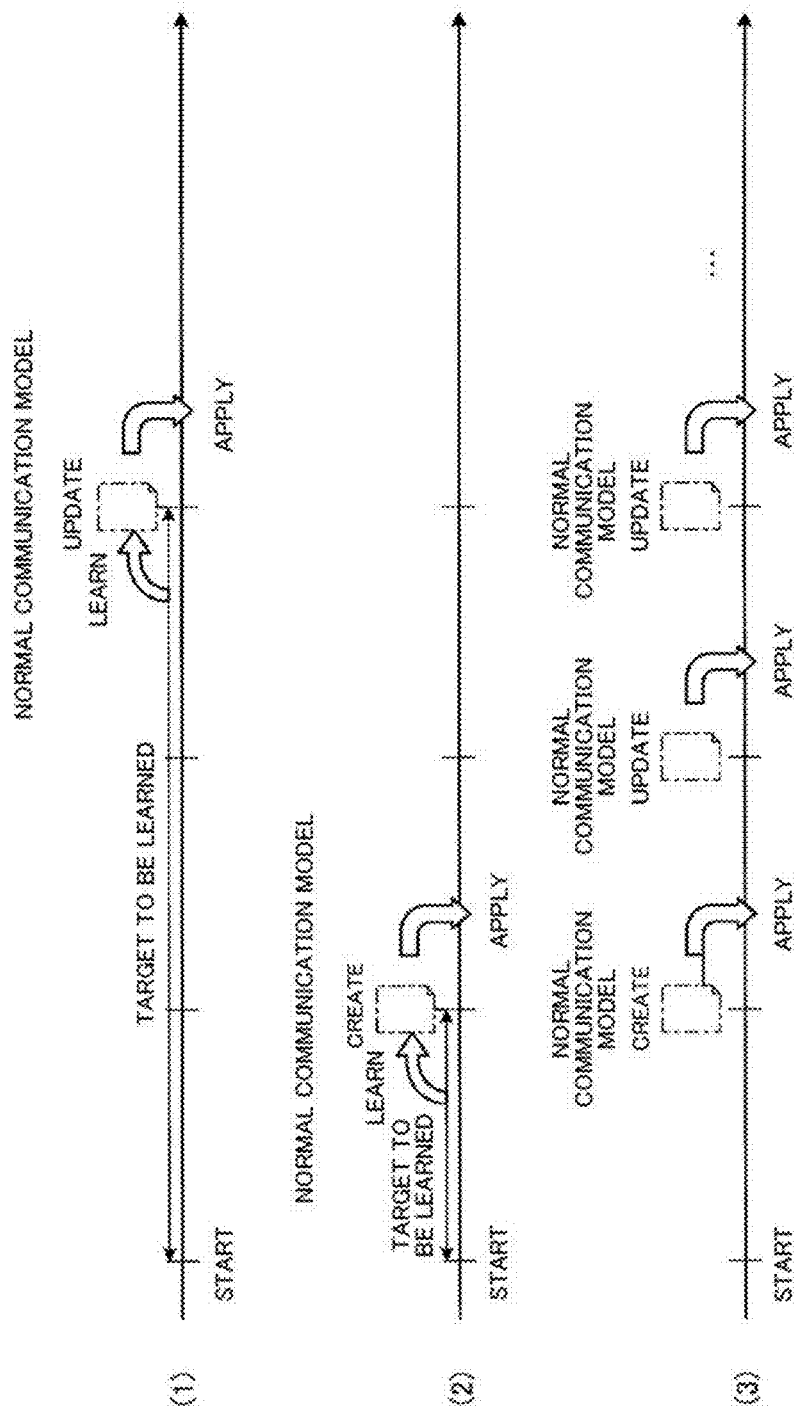
FIG. 10 is a diagram illustrating processing of creating a normal communication model by the related art and processing of creating a normal communication model by the IoT GW according to this embodiment.

FIG. 10 is a diagram illustrating processing of creating a normal communication model by the related art and processing of creating a normal communication model by the IoT GW 10 according to this embodiment. When a normal communication model is created and applied through learning, the related-art method applies the normal communication model after learning is finished.

However, in the related-art method, when learning is performed for a long period of time (refer to (1) of FIG. 10), much time is required until application of the normal communication model, resulting in degradation of convenience. Furthermore, in the related-art method, when learning is performed for a short period of time (refer to (2) of FIG. 10), there is a possibility that the accuracy of the normal communication model decreases, and excess or insufficiency of the normal communication model occurs after application.

In contrast, the IoT GW 10 can periodically apply the latest normal communication model created or updated through continued learning (refer to (3) of FIG. 10).

Furthermore, the IoT GW 10 determines whether to interrupt, finish, continue, and resume learning based on the load of the learning environment, the number of IoT devices 30 to be learned, the result of learning, and the length of the interruption period or end period, and controls the learning processing by the learning unit 131 based on the result of determination.

Therefore, in a case where the latest normal communication model is applied while learning is continued, the IoT GW 10 interrupts or finishes learning when a large load is imposed, and continues or resumes learning when a large load is not imposed. In this manner, the IoT GW 10 appropriately sets the learning period in consideration of the load of the learning environment, the number of IoT devices 30 to be learned, the learning result, and the length of the interruption period or end period, which prevents the learning processing from imposing a large load along with increase in number of IoT devices 30.

First Example

Figure 11:
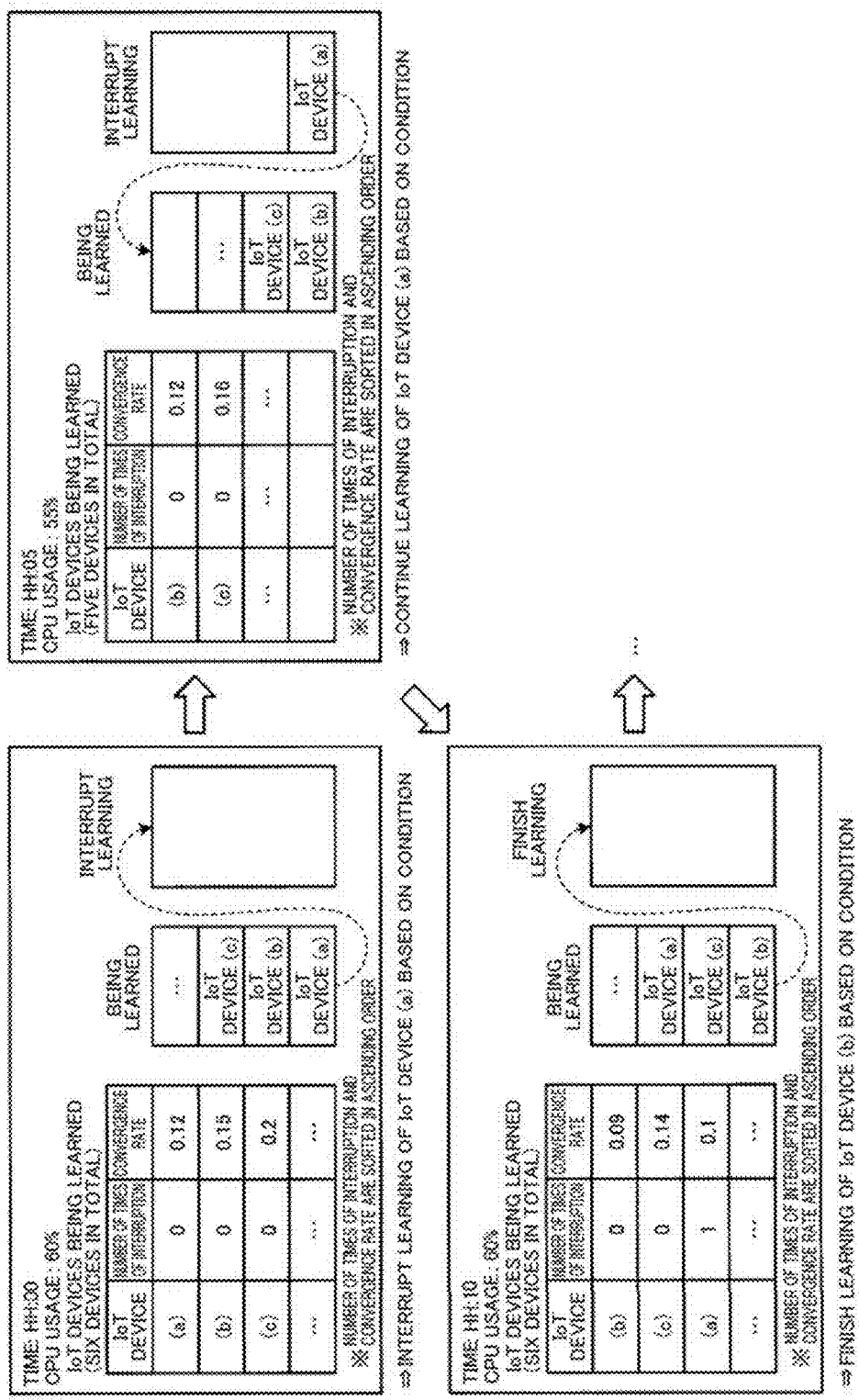
FIG. 11 is a diagram illustrating learning processing in a first example.

Next, description is given of a first example. FIG. 11 is a diagram illustrating learning processing in the first example.

First, a condition for interrupting, finishing, continuing, and resuming learning is set in the following manner.

Whether to interrupt and finish learning, and whether to continue learning are checked at a five-minutes interval. Then, the condition for checking the load of the learning environment due to learning specifies that the CPU usage is equal to or larger than 60% in determination of whether to interrupt or finish learning. This condition is the determination condition of Step S21 of FIG. 7. Furthermore, the condition for checking the load of the learning environment due to learning specifies that the CPU usage is smaller than 60% in determination of whether to continue or resume learning. This condition is the determination condition of Step S31 of FIG. 8 or Step S42 of FIG. 9.

The condition for checking the number of all IoT devices 30 being learned specifies that there are ten or more IoT devices 30 in determination of whether to interrupt or finish learning. This condition is the determination condition of Step S22 of FIG. 7. Furthermore, the condition for checking the number of all the IoT devices 30 being learned specifies that there are nine or less IoT devices 30 in determination of whether to continue or resume learning. This condition is the determination condition of Step S32 of FIG. 8 or Step S43 of FIG. 9.

Regarding the convergence rate serving as the condition for interrupting and finishing learning, learning is interrupted when the convergence rate is equal to or larger than 0.1, whereas learning is finished when the convergence rate is smaller than 0.1.

Regarding a relationship between the number of devices for which learning is to be continued and the CPU usage due to learning, the condition for continuing learning specifies that continuation of learning is determined for one device having the longest interruption period when the CPU usage is equal to or larger than 50% and smaller than 60%. Furthermore, the condition for continuing learning specifies that continuation of learning is determined for two devices having the longest and second longest interruption periods when the CPU usage is equal to or larger than 40% and smaller than 50%. Furthermore, the condition for continuing learning specifies that continuation of learning is determined for three devices having the longest, second longest, and third longest interruption periods when the CPU usage is smaller than 40%.

When this condition is used to control learning, the IoT GW 10 interrupts learning of the IoT device (a) for which the convergence rate is equal to or larger than 0.1 in the case of a time point "HH:00". When this learning is initial learning, the IoT GW 10 applies a normal communication model relating to the IoT device (a) created by the interruption time point.

Next, in the case of a time point "HH:05", the CPU usage is 55% based on the condition, and thus learning of one device having the longest interruption period, namely, the IoT device (a) in this case is continued. Then, in the case of a time point "HH:10", learning of an IoT device (b) for which the convergence rate is smaller than 0.1 is finished. Then, the IoT GW 10 applies a normal communication model relating to the IoT device (b) for which learning is finished.

Modification Example 1

Figure 12:
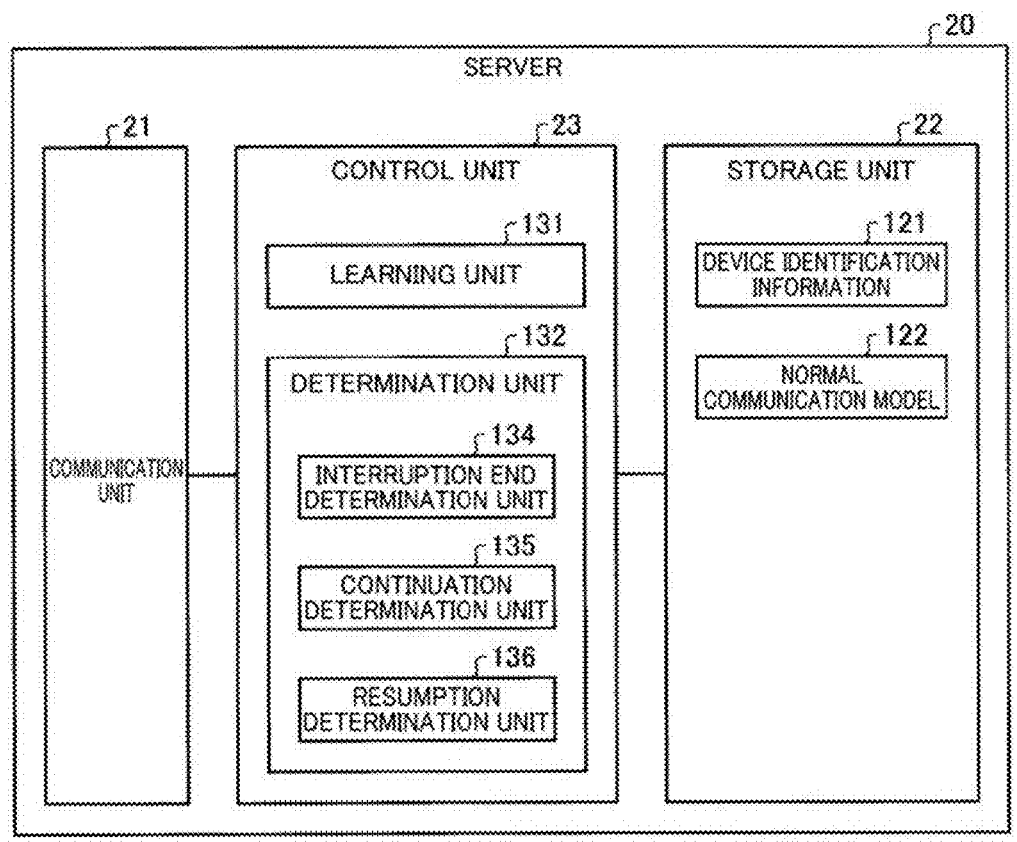
FIG. 12 is a block diagram illustrating an exemplary configuration of a server illustrated in FIG. 1.

Furthermore, in this embodiment, description has been given of a case in which the IoT GW 10 learns communication by the IoT device 30 to create a normal communication model. However, the server 20 may create a normal communication model. FIG. 12 is a block diagram illustrating an exemplary configuration of the server 20 illustrated in FIG. 1.

As illustrated in FIG. 12, the server 20 includes a communication unit 21 configured to communicate with other devices connected via a network, for example, a storage unit 22 constructed by a RAM or a flash memory, for example, and a control unit 23 constructed by a CPU, for example.

The server 20 acquires a normal communication pattern of the IoT device 30 accommodated in the IoT GW 10 from the IoT GW 10 via the communication unit 21, and the learning unit 131 creates the normal communication model 122 for each IoT device 30. Then, the determination unit 132 determines, for learning by the learning unit 131, whether to interrupt, finish, continue, and resume learning, and control the learning processing by the learning unit 131 based on the result of determination.

When the IoT GW 10 has a difficulty in creating the normal communication model 122, the server 20 may create or update the normal communication model 122 for each IoT device 30, and apply the latest normal communication model to the IoT GW 10.

[System Configuration and Other Configurations]

Each component of each illustrated device is a conceptual function, and it is not necessarily required to adopt the physical configuration as illustrated in the drawings. In other words, specific modes of distribution or integration of each device are not limited to those illustrated in the drawings, and the configuration of all or a part thereof can be distributed or integrated functionally or physically in any unit depending on various kinds of loads and usage statuses, for example. Furthermore, all or any part of each processing function to be implemented in each device may be implemented by a CPU or a program analyzed and executed by the CPU, or may be implemented as hardware through a wired logic.

Furthermore, all or a part of each processing described in this embodiment as being executed automatically can also be executed manually, or all or a part of processing described as being executed manually can also be executed automatically by a publicly known method. Besides, information including a processing procedure, a control procedure, a specific name, and various kinds of data and parameters illustrated in the above-mentioned description and the drawings can be changed in any manner unless specified otherwise.

[Program]

Figure 13:
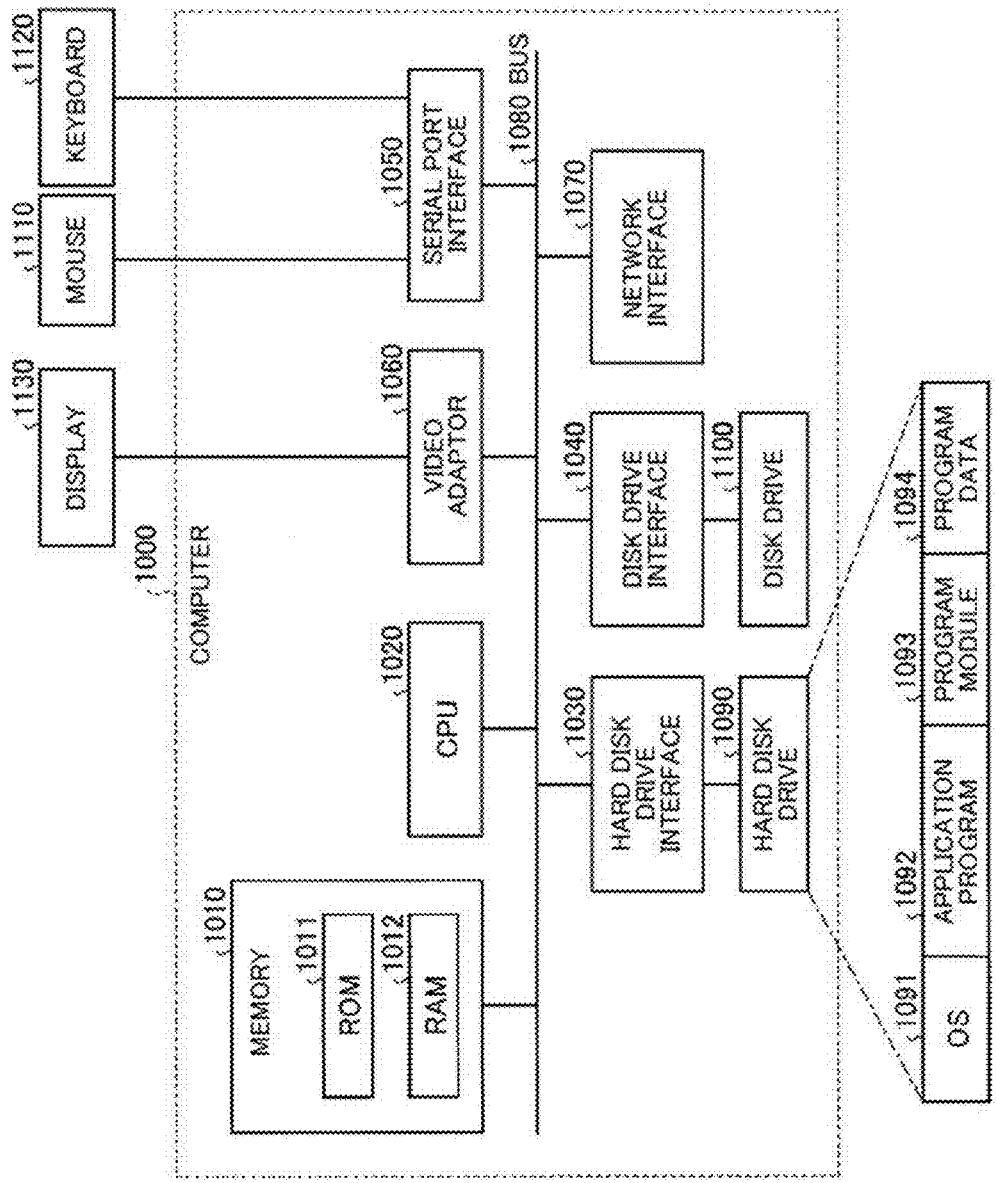
FIG. 13 is a diagram illustrating an example of a computer that implements the IoT GW and the server in an embodiment through execution of a program.

FIG. 13 is a diagram illustrating an example of a computer that implements the IoT GW 10 and the server 20 through execution of a program. A computer 1000 includes, for example, a memory 1010 and a CPU 1020. Furthermore, the computer 1000 includes a hard disk drive interface 1030, a disk drive interface 1040, a serial port interface 1050, a video adaptor 1060, and a network interface 1070. Those components are connected to one another via a bus 1080.

The memory 1010 includes a ROM 1011 and a RAM 1012. The ROM 1011 stores, for example, a boot program such as a basic input output system (BIOS). The hard disk drive interface 1030 is connected to a hard disk drive 1090. The disk drive interface 1040 is connected to a disk drive 1100. For example, a removable storage medium such as a magnetic disk or an optical disc is inserted into the disk drive 1100. The serial port interface 1050 is connected to a mouse 1110 and a keyboard 1120, for example. The video adaptor 1060 is connected to a display 1130, for example.

The hard disk drive 1090 stores an operating system (OS) 1091, an application program 1092, a program module 1093, and program data 1094, for example. Specifically, a program that specifies each processing of the IoT GW 10 and the server 20 is implemented as the program module 1093 in which a code that can be executed by a computer is described. The program module 1093 is stored in the hard disk drive 1090, for example. For example, the program module 1093 for executing processing similar to those of the functional configurations in the IoT GW 10 and the server 20 is stored in the hard disk drive 1090. The hard disk drive 1090 may be replaced with a solid state drive (SSD).

Furthermore, settings data to be used in the processing of the above-mentioned embodiment is stored in, for example, the memory 1010 or the hard disk drive 1090 as the program data 1094. Then, the CPU 1020 reads the program module 1093 or the program data 1094 stored in the memory 1010 or the hard disk drive 1090 as necessary into the RAM 1012 for execution.

The program module 1093 or the program data 1094 is not necessarily stored in the hard disk drive 1090, and for example, may be stored in a removable storage medium and read by the CPU 1020 via the disk drive 1100 or other media. Alternatively, the program module 1093 and the program data 1094 may be stored in other computers connected via a network (e.g., LAN and WAN (wide area network)). Then, the program module 1093 and the program data 1094 may be read from other computers by the CPU 1020 via the network interface 1070.

In the above, description has been given of an embodiment to which the invention made by the inventors is applied. However, the present invention is not limited by the description and the drawings that form a part of the disclosure of this embodiment of the present invention. In other words, all of other embodiments, examples, and operational technologies made by, for example, a person skilled in the art based on this embodiment fall within the scope of the present invention.

REFERENCE SIGNS LIST

1 Communication system
10 IoT GW
11,21 Communication unit
12,22 Storage unit
13,23 Control unit
121 Device identification information
122 Normal communication model
131 Learning unit
132 Determination unit
133 Communication control unit
134 Interruption end determination unit
135 Continuation determination unit
136 Resumption determination unit
20 Server
30 IoT device
N Network

The invention claimed is:

1. A control device, comprising:
learning circuitry configured to create, for each IoT device connected to an IoT gateway, a normal communication model that has learned a normal communication pattern of the IoT device; and
determination circuitry configured to:
determine, for learning by the learning circuitry, whether to interrupt, finish, continue, and resume learning based on a load of a learning environment, the load on the learning environment corresponding to a percentage of usage of a CPU; and control learning processing by the learning circuitry based on a result of determination,
wherein the determine to resume learning determines learning should be resumed when:
a period since an end of a previous learning is a multiple of a fixed value,
the load on the learning environment is smaller than a predetermined value, and
a number of devices being learned is smaller than a specific value.

2. The control device according to claim 1, further comprising:
communication control circuitry configured to control communication by the IoT device by applying the normal communication model created by the learning circuitry.

3. The control device according to claim 1, wherein the determination circuitry comprises first determination circuitry configured to:
determine, for each IoT device being learned, whether to interrupt or finish learning by the learning circuitry based on the load of the learning environment, a number of IoT devices to be learned, and a result of learning;
cause, when interruption of learning is determined, the learning circuitry to interrupt learning of the IoT device for which the interruption of learning has been determined; and
cause, when end of learning is determined, the learning circuitry to finish learning of the IoT device for which end of learning has been determined.

4. The control device according to claim 3, wherein the determination circuitry further comprises a second determination circuitry configured to:
periodically determine, for each IoT device for which learning is interrupted, whether to allow continuation of interrupted learning based on the load of the learning environment, the number of IoT devices to be learned, and a length of an interruption period; and
cause, when continuation of learning is determined, the learning circuitry to continue learning of the IoT device for which continuation of learning has been determined.

5. The control device according to claim 3, wherein the determination circuitry further comprises a third determination circuitry configured to:
periodically determine whether to allow resumption of learning based on the load of the learning environment and the number of IoT devices to be learned during a period since end of previous learning; and
cause the learning circuitry to resume learning when resumption of learning is determined.

6. A control method to be executed by a controller, the control method comprising:
a learning process of creating, for each IoT device connected to an IoT gateway, a normal communication model that has learned a normal communication pattern of the IoT device; and
a determination process of:
determining, for learning by the learning process, whether to interrupt, finish, continue, and resume learning based on a load of a learning environment, the load on the learning environment corresponding to a percentage of usage of a CPU; and
controlling learning processing in the learning process based on a result of determination,
wherein the determining to resume learning determines learning should be resumed when:
a period since an end of a previous learning is a multiple of a fixed value,
the load on the learning environment is smaller than a predetermined value, and
a number of devices being learned is smaller than a specific value.

7. A non-transitory computer readable medium storing a control program for causing a computer to execute:
a learning step of creating, for each IoT device connected to an IoT gateway, a normal communication model that has learned a normal communication pattern of the IoT device; and
a determination step of:
determining, for learning by the learning step, whether to interrupt, finish, continue, and resume learning based on a load of a learning environment, the load on the learning environment corresponding to a percentage of usage of a CPU; and
controlling learning processing in the learning step based on a result of determination,
wherein the determining to resume learning determines learning should be resumed when:
a period since an end of a previous learning is a multiple of a fixed value,
the load on the learning environment is smaller than a predetermined value, and
a number of devices being learned is smaller than a specific value.

8. The control device according to claim 1, wherein the determination circuitry is further configured to:
determine whether the load on the learning environment is larger than the predetermined value;
determine whether the number of devices being learned is smaller than the specific value; and
determine whether a number of times of interruption and convergence rate are minimum values,
wherein when the load on the learning environment is determined to be larger than the predetermined value, the number of devices being learned is determined to be smaller than the specific value, and when the number of times of interruption and convergence rate are the minimum values, the learning is determined to be finished when the convergence rate is smaller than a fixed convergence value, and
wherein when the load on the learning environment is determined to be larger than the predetermined value, the number of devices being learned is determined to be smaller than the specific value, and when the number of times of interruption and convergence rate are the minimum values, the learning is determined to be interrupted when the convergence rate is not smaller than the fixed convergence value.

9. The control method according to claim 6, wherein the determining further comprises:
determining whether the load on the learning environment is larger than the predetermined value;
determining whether the number of devices being learned is smaller than the specific value; and
determining whether a number of times of interruption and convergence rate are minimum values,
wherein when the load on the learning environment is determined to be larger than the predetermined value, the number of devices being learned is determined to be smaller than the specific value, and when the number of times of interruption and convergence rate are the minimum values, the learning is determined to be finished when the convergence rate is smaller than a fixed convergence value, and wherein when the load on the learning environment is determined to be larger than the predetermined value, the number of devices being learned is determined to be smaller than the specific value, and when the number of times of interruption and convergence rate are the minimum values, the learning is determined to be interrupted when the convergence rate is not smaller than the fixed convergence value.

10. The non-transitory computer readable medium according to claim 7, wherein the determining further comprises:

determining whether the load on the learning environment is larger than the predetermined value;

determining whether the number of devices being learned is smaller than the specific value; and determining whether a number of times of interruption and convergence rate are minimum values, wherein when the load on the learning environment is determined to be larger than the predetermined value, the number of devices being learned is determined to be smaller than the specific value, and when the number of times of interruption and convergence rate are the minimum values, the learning is determined to be finished when the convergence rate is smaller than a fixed convergence value, and wherein when the load on the learning environment is determined to be larger than the predetermined value, the number of devices being learned is determined to be smaller than the specific value, and when the number of times of interruption and convergence rate are the minimum values, the learning is determined to be interrupted when the convergence rate is not smaller than the fixed convergence value.

\* \* \* \* \*